| United States Patent [19] | [11] 3,876,578 |
| Takada et al. | [45] Apr. 8, 1975 |

[54] POLYMER EMULSION/DISPERSION BLEND COMPOSITIONS FOR COATINGS

[75] Inventors: Toshio Takada; Masaki Kobori; Noboru Kozima, all of Iwaki, Japan

[73] Assignee: Kureha Kagaku Kogyo Kabushiki Kaisha, Tokyo-to, Japan

[22] Filed: Feb. 5, 1974

[21] Appl. No.: 439,842

[52] U.S. Cl.............. 260/29.6 RB, 260/29.7 H, 260/29.7 UP, 260/876 R; 260/899
[51] Int. Cl.................. C08f 37/18; C08f 15/18
[58] Field of Search.... 260/29.7 H, 29.7 UP, 876 R, 260/899, 29.6 RB

[56] References Cited
UNITED STATES PATENTS

| 3,055,859 | 9/1962 | Vollmert............................ 260/45.5 |
| 3,345,434 | 10/1967 | Griffith.............................. 260/901 |
| 3,652,483 | 3/1972 | Tanaka et al................ 260/29.7 UP |
| 3,655,825 | 4/1972 | Souder et al................... 260/876 R |

*Primary Examiner*—Morris Liebman
*Assistant Examiner*—T. DeBenedictis, Sr.
*Attorney, Agent, or Firm*—Wenderoth, Lind & Ponack

[57] ABSTRACT

A polymer emulsion composition for forming coating films having improved anti-blocking and slipping properties can be produced by blending into combination:
1. 100 parts by weight (as resin) of a polymer emulsion wherein the polymer has a particle size range of between 0.05 to 0.5 micron, and
2. from 0.01 to 5 parts by weight (as resin) of a polymer dispersion or a dried polymer thereof having polymer particle of sizes from 1 to 5 microns and prepared by dispersing 100 parts by weight of an ethylenically unsaturated polymerizable monomer and from 0.01 to 10 parts by weight of a second monomer cross-linkable and copolymerizable with the first monomer into particles of sizes not more than 5 microns in an aqueous solution of a suspending agent and then polymerizing these monomers.

8 Claims, No Drawings

POLYMER EMULSION/DISPERSION BLEND COMPOSITIONS FOR COATINGS

BACKGROUND OF THE INVENTION

This invention relates generally to polymer emulsion compositions and more particularly to new and advanced polymer emulsion compositions for producing coatings having antiblocking and slipping properties improved by specific blended combinations.

It is well known that various polymer emulsions, when applied as coatings on various base materials (substrates) and dried, become coating films and impart various properties to these materials. For example, such films formed uniformly on the surfaces of base materials such as paper, paperboard, regenerated cellulose plastic film, and aluminum foil impart to these materials various properties such as heat-sealability, water resistance, oil and grease resistance, chemical resistance, low water vapor transmission rates, and low gas transmission rates. An example of a polymer emulsion used for imparting properties, such as low water vapor and gas transmission rate and heat-sealability to various base materials, is a vinylidene chloride copolymer emulsion. An example of a polymer emulsion used for imparting properties, such as heat-sealability and low water vapor transmission rate, is an acrylic copolymer emulsion or a vinyl chloride copolymer emulsion.

Sheet materials which have been coating processed with polymer emulsions of this character are useful particularly as packaging materials and are greatly improved in various properties, but since a polymer used for coating processing forms a uniform film, in general, it has a low flexural temperature and tends to have lower slipping and lubricating properties than the uncoated base material.

These disadvantages give rise to difficulties such as blocking at the time when the coated base material is rewound. That is, the coated material tends to resist processing, e.g. when processed in a packaging machine, due to the poor slipping or lubricating properties on the surface of the coated material. This diminishes the utility of the coated material in actual practice.

For overcoming these difficulties, methods such as roughening the coating film surface to reduce the contact surface area thereof and adding a substance to impart lubricity are known. In the practice of these methods, a material such as wax, paraffin, a fatty acid, an alkyl amide, a fatty acid ester, or an aqueous emulsion of these materials is added to the polymer emulsion, which is then used for coating processing to improve the lubricity due to surface wall film or to imporve the slipping property. Such methods, which employ the use of additives, however, are not satisfactory.

Polymer emulsions to which fine powders and the like of inorganic compounds such as silica, talc, calcium carbonate, and kaolin have also been added are used for coating processing. While the effectiveness of this method is recognizable, the distribution of the particle size range of these fine powders is broad, and, moreover, since their density is high, they readily settle out and tend to separate by sedimentation from the polymer emulsion, whereby these powders cannot be introduced uniformly into the resulting coating film.

We have undertaken various studies on additives which, when added to polymer emulsions, can improve their anti-blocking and slipping properties. We have carried out these studies with particular attention to additives which can be readily produced, which exhibit no deleterious effect relative to the coating process, which do not impair the properties of the film of the polymer emulsion applied on the basic material substrate, and which improve the anti-blocking and slipping properties of the product without impairing the transparency of the coating film.

As a result of these studies, it has become apparent that the following characteristics are desirable for these additives in order to cause roughening of the film surface without affecting the exterior appearance of the product and to improve the mixed state of the additive and the polymer emulsion.

1. The particle size should be from 1 to 5 microns, preferably from 2 to 3 microns.
2. The additive should not deform during ordinary drying of the polymer emulsion; preferably, it should not deform at 80°C.
3. The specific gravity should be of the order of unity (1.0), preferably from 0.9 to 1.3.

As materials having the above enumerated properties, fine particles of polymers may be considered. When, for the production of these fine particles, an ordinary suspension polymerization process is resorted to, the resulting polymer particle size becomes 10 microns or larger, and even by milling this polymer, it is difficult to obtain particles of sizes within a distribution range of from 1 to 5 microns.

Furthermore, in the case of ordinary emulsion polymerization, only polymer particles of sizes smaller than 1 micron can be obtained, and, in order to produce large particles of sizes greater than 1 micron, it becomes necessary to carry out, additionally, seed polymerization. This gives rise to complications in the production, and, moreover, the polymerization rate is slow, whereby this method has low practicability.

SUMMARY OF THE INVENTION

It is an object of this invention to overcome the above described difficulties and to provide polymer emulsion compositions for coatings wherein use is made of additives having the above enumerated desirable properties.

We have found that it is possible to produce a polymer dispersion having a polymer particle size of from 1 to 5 microns as an additive having the aforestated desirable properties by causing 100 parts by weight of an ethylenically unsaturated polymerizable monomer and from 0.01 to 10 parts by weight of a monomer crosslinkable and copolymerizable with the first mentioned monomer to disperse into the form of particles of particle sizes not more than 5 microns in an aqueous solution of a suspending agent and then causing the monomers to polymerize.

We have found further that, by adding from 0.01 to 5 parts, preferably 0.1 to 3 parts, by weight (as resin) of this polymer dispersion as it is, in a condensed state, or in the state of a dried polymer to 100 parts by weight (as resin) of a polymer emulsion for coatings, there is produced a polymer emulsion composition which, when applied as a coating, forms a coating film having anti-blocking and slipping properties which are greatly improved over those of a film formed from the original polymer emulsion without addition thereto of the polymer dispersion and having characteristics and clarity which are substantially unchanged from those of a film formed from the original polymer emulsion.

The nature, utility, and further features of this invention will be apparent from the following detailed description beginning with a consideration of the general aspects and features of the invention and concluding with specific examples as preferred embodiments.

DETAILED DESCRIPTION

In accordance with this invention, a specific polymer dispersion or dried polymer thereof is added to a polymer emulsion for coatings to improve its anti-blocking and slipping properties.

The polymer emulsions to be improved in accordance with the present invention may be any of these conventionally used for imparting properties, such as heat-sealability and a low water vapor transmission rate, to various base or substrate materials. Such polymer emulsions are well known to those skilled in the art and included emulsions of vinylidene chloride copolymers, such as those in which vinylidene chloride constitutes the substantial portion of, preferably the major portion such as 65 to 95% by weight of, the copolymer and emulsions of acrylic copolymers, such as those in which the lower alkyl acrylate constitutes the substantial portion of, preferably the major portion of, the copolymer.

A polymer dispersion or dried polymer thereof according to this invention is produced by dispersing 100 parts by weight of an ethylenically unsaturated polymerizable monomer and from 0.01 to 10 parts by weight of a monomer cross-linkable and copolymerizable with the first mentioned monomer in the form of particles of 5 microns or smaller in an aqueous solution of a suspending agent and then causing these monomers to polymerize to polymer particles of from 1 to 5 microns, and, if necessary, drying the dispersion.

Examples of ethylenically unsaturated polymerizable monomers suitable for use in accordance with this invention are vinyl chloride, vinylidene chloride, alkyl acrylates such as lower alkyl acrylates, e.g. $C_1$ to $C_8$ alkyl acrylates, alkyl methacrylates such as lower alkyl methacrylates, e.g. $C_1$ to $C_8$ alkyl methacrylates, styrene, vinyl toluenes, acrylonitrile, methacrylonitrile, styrene and methyl methacrylate are preferable. These monomers can be used singly or in combinations of two or more thereof.

The cross-linkable copolymerizable monomer is a monomer having two or more unsaturated double bonds within the molecule, examples of this monomer being divinyl benzene, ethylene glycol diacrylate or dimethacrylate and hexamethylene glycol diacrylate or dimethacrylate. Divinylbenzene and ethylene glycol dimethacrylate are preferable. The quantity of the cross-linkable monomer to be used in the copolymerization is 0.01 to 10 parts, preferably 0.5 to 5 parts, by weight per 100 parts by weight of the ethylenically unsaturated monomer. Copolymerization of these monomers is effective for causing cross linking of the polymer and reducing thermal deformation.

Example of initiators suitable for use for causing these monomers to polymerize are peroxides such as benzoyl peroxide and lauroyl peroxide and azo compounds, such as azobisisobutylonitrile. In general, an initiator which is soluble in these monomers is used.

As a suspending agent, a water-soluble high polymer such as polyvinyl alcohol, methyl cellulose, carboxymethyl cellulose, and gelatine is used in a quantity, in general, of from 0.1 to 10 parts by weight relative to 100 parts by weight of the monomers.

A heat stabilizer and other additives may be added, and an additive such as an emulsifier may be used to stabilize the suspension.

When the monomers with an initiator dissolved therein are dispersed in an aqueous solution of a suspending agent, they can be dispersed only as droplets having particle sizes of 10 microns or larger with ordinary agitation, and only polymer particles of the polymer dispersion prepared by polymerizing these monomers of sizes of 10 microns or more can be obtained. In accordance with this invention, means such as a homogenizer, a colloid mill, or an ultrasonic device are used when monomers with an initiator and other additives dissolved therein are dispersed in an aqueous solution of the suspending agent thereby to disperse the monomers forcibly in the form of particles of 5 microns or smaller. Then, the monomers are heated and polymerized to prepare a polymer dispersion having particles of sizes from 1 to 5 microns.

The agitation during this polymerization may be of an intensity such that the dispersed particles do not cohere or aggregate, and agitation of an intensity in the order of that used in ordinary suspension polymerization is sufficient.

Sheet products, such as paper, paperboard, and plastic film coatprocessed with a vinylidene chloride copolymer, for example, as a polymer emulsion, have low water-vapor and gas transmission rates, excellent chemical resistance, and other properties but have poor anti-blocking and slipping properties and, therefore, low practical value.

A coated product produced by preparing a polymer dispersion having particles of sizes from 1 to 5 microns by dispersion and polymerization of methyl methacrylate and divinyl benzene, for example, into particles 5 microns or smaller in an aqueous solution of a suspending agent in accordance with this invention, and by adding this polymer dispersion to the above mentioned vinylidene chloride copolymer emulsion, and coating a base material with the resulting emulsion, has characteristics comparable to those of a vinylidene chloride copolymer and, moreover, has excellent anti-blocking and slipping properties.

For the polymer emulsion, in addition to the vinylidene chloride copolymer emulsion, others such as an acrylic copolymer emulsion, a vinyl chloride copolymer emulsion, and a synthetic rubber latex such as a butadiene-styrene copolymer can also be used.

In order to indicate more fully the nature and utility of this invention, the following specific examples are set forth, it being understood that these examples are present as illustrative only and are not intended to limit the scope of the invention. Throughout these examples, quantities expressed as "parts" and "percent" are by weight.

EXAMPLE 1

100 parts of methyl methacrylate, 5 parts of divinyl benzene, and 0.5 parts of benzoyl peroxide as a polymerization initiator were mixed to cause dissolution. The resulting solution was mixed into 200 parts of a 1-percent aqueous solution of polyvinyl alcohol (degree of saponification: 88-percent and degree of polymerization: 1,400) used as a suspending agent, and dispersion was carried out through the use of a homogenizer until the monomer particle size became from 1 to 3 microns.

The resulting material was caused to undergo polymerization for 20 hours under agitation at 60°C in a nitrogen atmosphere. The resin suspension thus-obtained contained particles of particle sizes from 1 to 3 microns.

One part (as resin) of this suspension was added to 100 parts (as resin) of a vinylidene chloride copolymer resin emulsion (particle size of from 0.1 to 0.15 micron) prepared by causing 91 parts of vinylidene chloride, 8 parts of methyl acrylate, and 1 part of itaconic acid to undergo emulsion copolymerization.

This mixed resin suspension was applied as a coating of 3-micron thickness on a sheet of biaxially oriented polyethylene terephthalate film (of 12-micron thickness) which had been primer processed with a polyurethane resin by an ordinary process. This coating was dried at 120°C.

A comparison of certain physical properties of the coating film thus-obtained and of a coating film obtained from a vinylidene chloride copolymer resin emulsion without any additive is indicated in Table 1.

Table 1

| Item | Film according to this invention | Film produced without resin suspension additive |
| --- | --- | --- |
| Cloudiness (ASTM D 1003) | 2.5 | 2.0 |
| Oxygen transmission rate cm³/m². 24 hr.atm, 20°C (ASTM D 1434) | 12 | 11 |
| Coefficient of friction (ASTM D 1894) | | |
| Static frictional coeff. | 0.3 | 0.8 |
| Dynamic frictional coeff. | 0.2 | 0.3 |

It was found that the film according to this invention, while exhibiting an oxygen transmission rate and a clarity which were almost the same as those of a film produced without an additive, had appreciably lower coefficients of friction and also had improved mechanical properties.

EXAMPLE 2

100 parts of methyl methacrylate, 0.5 part of ethylene glycol dimethacrylate, and 0.5 part of lauroyl peroxide as a polymerization initiator were mixed, and the resulting mixture was mixed into 300 parts of a 2-percent aqueous solution of methyl cellulose as a suspending agent. The resulting mixture was caused to undergo dispersion by means of a homogenizer until the monomer particle size became from 1 to 3 microns. The dispersion thus-obtained was caused to undergo polymerization for 20 hours under agitation in a nitrogen atmosphere at 50°C. The particle size of the particles in the resin suspension thus-obtained was from 1 to 3 microns.

0.5 parts (as resin) of the suspension thus-obtained was added to 100 parts (as resin) of an acrylic copolymer resin emulsion (particle size from 0.15 to 0.2 micron) prepared by emulsion copolymerizing 60 parts of ethyl acrylate, 38 parts of styrene, and 2 parts of acrylic acid.

The mixture resin emulation thus-obtained was applied as a coating film of 2-micron thickness on a biaxially oriented polypropylene film (of 20-micron thickness) primer processed with a polyurethane resin by an ordinary process, and the coating film was then dried at 120°C.

A comparison of certain physical properties of the coating film thus-obtained and a coating film similarly formed through the use of an acryl copolymer resin emulsion without any additive is indicated in Table 2.

It was found that the film according to this invention, while exhibiting a heat-seal strength and transparency which were almost the same as those of the film produced without an additive, had improved anti-blocking properties, a small coefficient of friction, and improved mechanical properties.

Table 2

| Item | Film according to this invention | Film without additive |
| --- | --- | --- |
| Cloudiness (ASTM D 1003) | 2.0 | 1.5 |
| Heat-seal strength g/15mm (heat-sealing at 120°C, 1 kg/cm²) | 220 | 215 |
| Degree of anti-blocking (pressed 24 hrs. at 50°C, 125 g/cm²) | no sticking | sticking |
| Coefficients of friction (ASTM D 1894) | | |
| Static frictional coeff. | 0.28 | 0.6 |
| Dynamic frictional coeff. | 0.20 | 0.35 |

EXAMPLE 3

100 parts of styrene, 1 part of ethylene glycol dimethacrylate, and 0.5 part of lauroyl peroxide as an initiator were mixed. The resulting mixture was dispersed in 300 parts of a 2-percent aqueous solution of methyl cellulose through the use of ultrasonic agitation until the monomer droplet size became from 1 to 2 microns.

The resulting dispersion was polymerized for 20 hours in a nitrogen atmosphere at 50°C under agitation.

The polymer particle size of the polymer dispersion thus-obtaineid was from 1 to 2 microns for more than 90 percent of the particles.

2 parts of this polymer dispersion was added to 100 parts of the vinylidene chloride copolymer emulsion specified in Example 1, and the resulting emulsion was applied as a coating on a biaxially oriented polyethylene terephthalate film and then dried to form a coating film by the procedure set forth in Example 1.

The physical properties of this coating film were compared with those of a film produced without an additive and found to be almost the same in oxygen transmission rate and clarity, similar to Example 1, but was found to have a lower coefficient of friction and improved mechanical properties.

We claim:

1. A polymer emulsion useful for forming coatings comprising in admixture (1) 100 parts, as resin, of a polymer emulsion, wherein the polymer particles in the emulsion have a particle size range of from 0.05 to 0.5 micron, and (2) from 0.01 to 5 parts by weight, as resin, of a polymer dispersion or dried polymer thereof wherein the polymer particles have a particle size range of 1 to 5 microns, said polymer dispersion being prepared by dispersing 100 parts by weight of a first monomer selected from the group consisting of methyl methacrylate and styrene and from 0.01 to 10 parts by weight of a second monomer cross-linkable and copolymerizable with said first monomer into particles having a size range of not more than 5 microns into an aqueous solution of a suspending agent and then causing said monomers to polymerize.

2. A polymer emulsion composition for coatings as claimed in claim 1 in which said second monomer is a monomer selected from the group consisting of divinyl benzene and ethylene glycol dimethacrylate.

3. A polymer emulsion composition for coatings as claimed in claim 2 in which said second monomer is in a quantity of from 0.5 to 5 parts by weight.

4. A polymer emulsion composition for coatings as claimed in claim 1 in which said polymer emulsion is an emulsion selected from the group consisting of vinylidene chloride copolymer emulsions and acrylic copolymer emulsions.

5. A polymer emulsion composition according to claim 4 wherein the polymer emulsion (1) is a vinylidene chloride copolymer emulsion in which vinylidene chloride constitutes 65% to 95% by weight of the copolymer.

6. A polymer emulsion according to claim 5 wherein the vinylidene copolymer emulsion is prepared by copolymerizing 91 parts of vinylidene chloride, 9 parts of methyl acrylate and 1 part of itaconic acid.

7. A polymer emulsion composition according to claim 4 wherein the polymer emulsion (1) is an acrylic copolymer emulsion in which a lower alkyl acrylate constitutes the major portion of the molecule.

8. A polymer emulsion according to claim 1 wherein component (2) is in the form of a polymer dispersion.

* * * * *

UNITED STATES PATENT OFFICE
CERTIFICATE OF CORRECTION

Patent No. 3,876,578          Dated April 8, 1975

Inventor(s) Toshio Takada, Masaki Kobori and Noboru Kozima

It is certified that error appears in the above-identified patent and that said Letters Patent are hereby corrected as shown below:

Page one, first column, below the line reading "[21] Appl. No.: 439,842", insert the following:

--     [30]       Foreign Application Priority Data

February 8, 1973   Japan . . . . . 15,141,1973
        February 8, 1973   Japan . . . . . 15,142/1973 --.

Signed and sealed this 15th day of July 1975.

(SEAL)
Attest:

RUTH C. MASON
Attesting Officer

C. MARSHALL DANN
Commissioner of Patents
and Trademarks